May 9, 1939. C. T. PFLUEGER 2,158,037
ARTIFICIAL BAIT
Filed June 26, 1936

INVENTOR
CHARLES T. PFLUEGER
BY Albert L. Ely
ATTORNEY

Patented May 9, 1939

2,158,037

UNITED STATES PATENT OFFICE 2,158,037

ARTIFICIAL BAIT

Charles T. Pflueger, Akron, Ohio, assignor to The Enterprise Manufacturing Company, Akron, Ohio, a corporation of Ohio Application June 26, 1936, Serial No. 87,475

4 Claims. (Cl. 43—46)

The present invention relates to artificial baits or minnows which are used in casting or trolling. These baits usually consist of a body in the general form of a minnow or the like, the forward end of which is provided with means to resist the passage of the bait through the water, thus causing the bait to travel through the water at a distance below the surface and setting up a wiggling or wobbling movement. It is quite common to provide the bait body or plug with a metal diving plane.

It is the purpose of the present invention to improve upon the construction and mode of attachment of a diving plate to the bait body and for this purpose the invention contemplates a simple and very effective means of attaching the plate to the forward end of the bait as will be described herein.

It will be apparent that the invention is not confined to the identical form shown and described herein, but may be modified or varied within the scope of the invention as set forth in the claims hereto.

Figure 1:
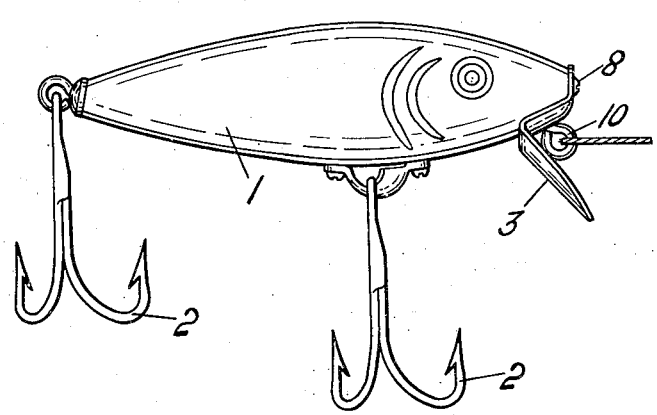
Figure 1 is a side elevation of a bait embodying the invention.
Figure 2:
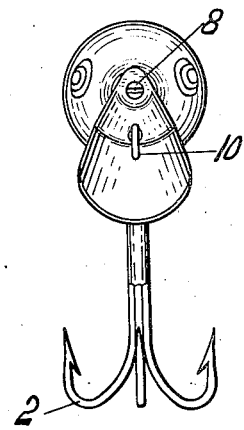
Figure 2 is a view looking at the forward end of the bait.
Figure 3:
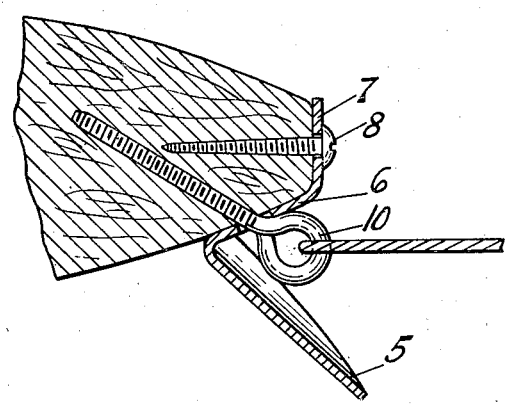
Figure 3 is an enlarged cross-section at the forward end of the bait.

The bait consists of the body 1 which is preferably in the form which simulates a fish or minnow. The body is usually made of wood or similar material and the forward end is reduced and tapering to a snout. The body is usually round in cross-section and is provided with a plurality of hooks 2.

To the forward end of the body is attached the diving and wiggling plate 3. It is the construction and method of mounting this plate which is new and novel and by which a very simple and inexpensive mounting is secured. The plate is so formed and mounted that only a single screw attachment is required, and the body supports and reinforces the plate so that it is very rigid. The shape of the plate and the method of its mounting contribute to the results secured.

The plate, which has been designated as a whole by the numeral 3, is formed from a single piece of metal which is somewhat fan-shaped, the wider or more extended portion of the plate forming a forwardly and downwardly extending diving portion 5. This portion of the plate is preferably slightly concave or scoop-shaped, so as to assist in its reaction to the water and also to give it additional strength. Above the scoop portion of the plate the body is reversely bent to form a bearing section 6 which is arched in the reverse direction to the scoop portion so as to fit snugly around and against the forward end of the bait. This bearing section extends from the tip of the bait body to the point in the rear thereof from which the scoop portion is extended. The fact that the bearing portion of the plate is arched to fit against the bait body and is reversely bent both in direction and curvature to the scoop portion makes a very strong and rigid device which will withstand severe usage and abuse.

The upper extremity of the plate is formed with an ear 7 which is bent upwardly and fitted directly against the flattened nose of the bait body, where it is held in place by a single screw 8. This screw is the only means required to hold the plate securely in position and except for the fact that the plate may rotate about the screw no other fastening means is required. Any suitable dowel means may be used to prevent the rotation of the plate, but for this purpose the usual line attaching screw has been used. This screw is shown at 10 and is preferably located so that it passes through the bearing section 6. This screw will prevent the rotation of the plate and in addition gives a point of attachment for the line below the axial center of the bait body, which imparts an improved action to the bait.

The features of the invention are the simplicity and economy of manufacture as the plate may be formed with a single stamping operation; the fact that it may be attached by a single screw and needs only the provision of means to prevent its rotation, which, in the preferred embodiment, is provided by the necessary line attaching screw; and the strength and rigidity secured by the shape of the plate and the fact that it is mounted with a bearing portion lying against and supported by the body. The plate may be made of a thin gauge metal and will withstand extreme and severe usage without damage or deformation.

What is claimed is:

1. An artificial bait comprising the combination with a bait body having a tapered rounded forward end, a metal plate having a forwardly and downwardly directed portion, a reversely bent and transversely arched portion fitting against the underside of the body, and a tip extending upwardly from said last mentioned portion over the front end of the body, and securing means passing through the tip into the bait body.

2. An artificial bait comprising the combination with a bait body having a tapered rounded forward end, a metal plate having a forwardly and downwardly directed portion, a reversely bent portion fitting against and supported by the underside of the body, the latter portion merging into a terminal tip that extends over the front end of the body, a screw passing through the tip and into the body, and means for preventing the rotation of the plate about the screw.

3. An artificial bait comprising the combination with a bait body having a tapered rounded forward end, a metal plate having a forwardly and downwardly directed portion, a reversely bent portion on the rear of the latter fitting against and supported by the underside of the body and a tip on said last mentioned portion extending over the front end of the body, a screw passing through the tip and into the body, and a line attaching screw passing through the reversely bent portion into the bait body.

4. The combination with a bait body and a plate angularly formed and having a medial portion fitted against the underside of the bait body, a second portion extending downwardly and forwardly from one end thereof to form a diving portion, and a terminal lug extending upwardly in continuation of the other end thereof over the end of the body, and securing means passing through the lug into the body.

CHARLES T. PFLUEGER.